United States Patent
Ngo

(10) Patent No.: US 9,515,869 B2
(45) Date of Patent: Dec. 6, 2016

(54) SYSTEMS AND METHODS FOR SERVER CLUSTER APPLICATION VIRTUALIZATION

(71) Applicant: DH2I Company, Fort Collins, CO (US)

(72) Inventor: Thanh Q. Ngo, Oregon City, OR (US)

(73) Assignee: DH2I Company, Fort Collins, CO (US)

( * ) Notice: Subject to any disclaimer, the term of this patent is extended or adjusted under 35 U.S.C. 154(b) by 453 days.

(21) Appl. No.: 13/743,007

(22) Filed: Jan. 16, 2013

(65) Prior Publication Data

US 2013/0185408 A1 Jul. 18, 2013

Related U.S. Application Data

(60) Provisional application No. 61/588,011, filed on Jan. 18, 2012.

(51) Int. Cl.
| | |
|---|---|
| *H04L 12/24* | (2006.01) |
| *G06F 11/20* | (2006.01) |
| *G06F 11/14* | (2006.01) |
| *G06F 9/50* | (2006.01) |

(52) U.S. Cl.
CPC ........... *H04L 41/046* (2013.01); *G06F 9/5077* (2013.01); *G06F 11/1484* (2013.01); *G06F 11/203* (2013.01); *G06F 11/2035* (2013.01); *G06F 11/2046* (2013.01); *G06F 9/5088* (2013.01)

(58) Field of Classification Search
CPC ................ H04L 41/046; H04L 61/2007; G06F 9/45558; G06F 9/5077
USPC .......................................... 718/1, 105, 104
See application file for complete search history.

(56) References Cited

U.S. PATENT DOCUMENTS

| | | | | |
|---|---|---|---|---|
| 7,519,814 B2 * | 4/2009 | Rochette | ................... | G06F 8/60 709/214 |
| 7,814,364 B2 * | 10/2010 | Sankaran | ............ | G06F 11/2038 714/4.12 |
| 8,745,214 B2 * | 6/2014 | Inamdar | .............. | G06F 11/3404 709/224 |
| 2006/0195561 A1 * | 8/2006 | Keane | ................. | H04L 41/5012 709/223 |
| 2008/0126834 A1 * | 5/2008 | Sankaran | ............ | G06F 11/2038 714/4.12 |
| 2009/0328077 A1 * | 12/2009 | Kashyap | ................. | G06F 9/445 719/328 |
| 2010/0077395 A1 * | 3/2010 | Edwards | ................. | H04L 12/66 718/1 |
| 2010/0125844 A1 | 5/2010 | Mousseau | | |
| 2011/0209145 A1 * | 8/2011 | Chen | ................... | G06F 9/45558 718/1 |

(Continued)

OTHER PUBLICATIONS

Angelo, Gaeta et al., "Design Patterns for Secure Virtual Organization Management Architecture", Sep. 17, 2007, pp. 207-216, IEEE, Piscataway, NJ, USA.

*Primary Examiner* — Patrice Winder
*Assistant Examiner* — Ruth Solomon
(74) *Attorney, Agent, or Firm* — Martensen IP

(57) ABSTRACT

Application instances can be virtualized and operate in a fault tolerant and load-balanced means across a cluster of servers while still maintaining access to a common pool of data. Each application instance is instantiated so to operate on top of a virtual host that possesses a distinct virtual Internet protocol address. Each node within a server cluster environment can possess one or more virtual hosts wherein upon server failover the virtual host and its associated virtual Internet protocol address can be relocated to another server without disturbing the instantiation of the application on the virtual host.

20 Claims, 7 Drawing Sheets

(56) References Cited

U.S. PATENT DOCUMENTS

| | | | | |
|---|---|---|---|---|
| 2011/0307886 A1* | 12/2011 | Thanga | ............... | G06F 9/5077 718/1 |
| 2012/0110574 A1* | 5/2012 | Kumar | ............... | G06F 9/45558 718/1 |
| 2012/0144005 A1* | 6/2012 | Quintard | ............... | G06F 8/61 709/220 |
| 2013/0086147 A1* | 4/2013 | Kashyap | ............... | H04L 67/10 709/203 |
| 2013/0132946 A1* | 5/2013 | Ma | ............... | G06F 11/006 718/1 |
| 2013/0159487 A1* | 6/2013 | Patel | ............... | H04L 67/1031 709/223 |
| 2013/0185716 A1* | 7/2013 | Yin | ............... | G06F 9/45558 718/1 |
| 2014/0115584 A1* | 4/2014 | Mudigonda | ............... | H04L 67/1095 718/1 |
| 2014/0137125 A1* | 5/2014 | Hsu | ............... | G06F 9/4856 718/102 |

\* cited by examiner

SYSTEMS AND METHODS FOR SERVER CLUSTER APPLICATION VIRTUALIZATION

RELATED APPLICATION

The present application relates to and claims the benefit of priority to U.S. Provisional Patent Application No. 61/588,011 filed Jan. 18, 2012, which is hereby incorporated by reference in its entirety for all purposes as if fully set forth herein.

BACKGROUND OF THE INVENTION

Field of the Invention

Embodiments of the present invention relate, in general, to software virtualization and more particularly, to virtualization of cluster server applications across multiple nodes in a server cluster.

Relevant Background

A server is a physical computer dedicated to run one or more services to serve the needs of the users of other computers on a network. Said differently, any computerized process that shares a resource to one or more client processes is, for all intents and purposes, a server. For example, the mechanism that shares files to clients by the operating systems is a file server. Thus, depending on the computing service that the server offers, the server could be a database server, a file server, a mail server, a print server, a web server, a game server or some other kind of server based on the services it provides. In the hardware sense, the word server typically designates computer models intended for hosting software applications under heavy demand in a network environment. And in some cases, the hardware for these specific functions is specialized. That is, a server computer possesses different capabilities than that of a general purposes personal computer.

A server cluster is a group of at least two independent servers connected by a network and managed as a single system to provide high availability of services for clients. FIG. 1A is a high level depiction of a server cluster environment as would be known to one of reasonable skill in the relevant art. In the illustrated depiction, four servers comprise a server cluster 100. In this case, server A 110, server B 120, server C 130, and server D 140 are linked both directly and via a load balancer/router 150. The router 150 further serves as access to the Internet 170 and the firewall 160.

Server clusters are designed so that the servers in the cluster work together to protect data, keep applications and services running after the failure of one or more servers in the cluster, and maintain consistency of the cluster configuration. The clustering of servers provides a number of benefits over independent servers. One important benefit is that cluster software, which is run on each of the servers in a cluster, automatically detects application failures or the failure of another server in the cluster. Upon detection of such failures, failed applications and the like can be terminated and restarted on a surviving server. So, when a failure occurs on one computer in a cluster, resources are redirected and the workload redistributed to another computer in the cluster.

FIG. 1B is a further illustration of the server cluster shown in FIG. 1A in which server C 130 has failed. As would be known by one of reasonable skill in the relevant art, the removal of the server in a server cluster utilizes existing failover technology to terminate and restart the applications associated with server C 130 on another server within the server cluster. However, by doing so the applications associated with server C must be re-instantiated with a new host and new Internet protocol address.

Other benefits of server clusters include the ability for administrators to inspect the status of cluster resources, and accordingly balance workloads among different servers in the cluster to improve performance. Such manageability also provides administrators with the ability to update one server in a cluster without taking important data and applications offline. As can be appreciated, server clusters are used in critical database management, file and intranet data sharing, messaging, general business applications and the like.

Server clusters come in all shapes and sizes but they are generally either asymmetric clusters or symmetric clusters. In an asymmetric cluster, a standby server exits only to take over for another server in the event of failure. This type of cluster provides high availability and reliability of services but does so at the cost of having redundant and unused capability. The standby server performs no useful work and is either as capable or less capable than the primary server. In a symmetric server cluster, every server in the cluster preforms some useful work and each server in the cluster is the primary host for a particular set of applications. If a server fails, the remaining servers continued to process the assigned set of applications as well as pick up new applications from the failed server. Symmetric server clusters are more cost effective but, in the event of a failure, the additional load on the working servers can make them fail as well.

On each server exists one or more instantiations of various applications. Underlying these applications is a database engine such as Microsoft Transacted Structured Query Language or T-SQL. T-SQL is a special purpose programming language designed for managing data in relational database management systems. Originally built on relational algebra and tuple relational calculus, its scope includes data insert, query, update and delete functionality, schema creation and modification, and data access control. Other relational alternatives to SQL include .QL, 4D Query Language, Datalog, URL based query method, IBM Business Systems I2, ISBL, JPQL, Object Query Language, UnQL, QBE and the like.

SQL is a popular database engine that servers use as a building block for many larger custom application. Each application built using SQL Server (or the like) typically communicates with a single instance of the database engine using that servers name and Internet Protocol address. Thus, servers with many applications depending on SQL server to access a database must normally run an equal number of instances of SQL server. In most cases, each instance of SQL server runs on a single node within the server cluster, each with its own name and address. If the node (server) fails, the database are unavailable until the system is restored on a new node with a new address and name. If the node becomes heavily loaded by one or more applications, the performance of the database and other applications can be degraded.

Generally, there are three types of server cluster failures. The first is application or service failure. These failures occur when application software running on a server fails to perform properly. Second is a system or hardware failure. As implied, this type of failure is tied to the hardware components of one or more servers. For example, the failure of one or more CPUs, drives, memory or power supply. Lastly, a site failure can occur when, due to a natural event such as a storm or a power failure, an entire site fails to perform as expected. The ability to handle each of these types of failures is critical to server cluster's reliability.

Thus, the failover of an application from one server (i.e., machine) to another in the cluster may be automatic in response to a software or hardware failure on the first machine, or alternatively, may be manually initiated by an administrator. However, unless an application is "cluster-aware" (i.e., designed with the knowledge that it may be run in a clustering environment), problems arise during failover.

One problem with existing virtual applications that are not cluster-aware, i.e., legacy applications such as SQL server, is that such applications assume that the current machine name is the only computer name. Consequently, if the application exposes the machine name to clients, or writes the machine name into its persistent configuration information, the system will not function correctly when the application fails over and runs on a different machine having a different machine name. By way of example, an electronic mail application program provides its machine name to other machines connected thereto in a network. If the application is running in a cluster and the server is failed over to another machine, this other machine's name will not be the name that was provided to the other network machines, and the electronic mail application will not function correctly.

To address this deficiency, traditional virtualization platforms for applications in the prior art use failover clustering technology. For example, Microsoft Windows® uses Microsoft Failover Clustering ("MSCS")®. MSCS, and products like MSCS, allows one or more computers to join together to form a cluster. An application then can be made to listen and provide data to clients via a cluster host name or Internet Protocol ("IP") address and not individual computer names. If an active node (computer) fails, MSCS would reposition the application over to the next available node in the cluster to maintain functionality of the application. To avoid data corruption and to ensure only one node in the entire cluster can have access to the file system, New Technology File System ("NTFS"), Small Computer System Interface ("SCSI") reservation is employed. What is lacking however, is the ability to virtualize an application, such as SQL server, in a cluster environment without utilizing MSCS and SCSI reservation.

One of reasonable skill in the relevant art will recognize that virtualization, broadly defined, is the simulation of the software and/or hardware upon which other software runs. This simulated environment is often called a virtual machine (VM). A virtual machine is thus a simulation of a machine (abstract or real) that is usually different from the target (real) machine (where it is being simulated on). Virtual machines may be based on specifications of a hypothetical computer or emulate the computer architecture and functions of a real world computer. There are many forms of virtualization, distinguished primarily by the computing architecture layer, and virtualized components, which may include hardware platforms, operating systems (OS), storage devices, network devices or other resources.

Application or process virtualization can be viewed as part of an overall trend in enterprise IT that includes autonomic computing. Autonomic computing is a scenario in which the IT environment is able to manage itself based on perceived activity, and utility computing, in which computer processing power is seen as a utility that clients can pay for only as needed. The usual goal of virtualization is to centralize administrative tasks while improving scalability and overall hardware-resource utilization. This type of parallelism tends to reduce overhead costs and differs from multitasking, which involves running several programs on the same OS (component).

Hardware virtualization or platform virtualization refers to the creation of a virtual machine that acts like a real computer with an operating system. Software executed on these virtual machines is separated from the underlying hardware resources. For example, a computer that is running Microsoft Windows may host a virtual machine that looks like a computer with the Ubuntu Linux operating system; Ubuntu-based software can be run on the virtual machine.

In hardware virtualization, the host machine is the actual machine on which the virtualization takes place, and the guest machine is the virtual machine. The words host and guest are used to distinguish the software that runs on the physical machine from the software that runs on the virtual machine. The software or firmware that creates a virtual machine on the host hardware is sometimes called a hypervisor.

A significant limitation to a server cluster environment is the inability to manage individual applications during a failover. What is needed, therefore, is a method and system to virtualize an application such as SQL server in a cluster environment without the required use of MSCS or the like. There is also a need to establish a shared cluster system in which every node in a cluster possesses continuous full read and write access and thus eliminate the need for MSCS or SCSI reservations. These and other deficiencies of the prior art are addressed by one or more embodiments of the present invention.

Additional advantages and novel features of this invention shall be set forth in part in the description that follows, and in part will become apparent to those skilled in the art upon examination of the following specification or may be learned by the practice of the invention. The advantages of the invention may be realized and attained by means of the instrumentalities, combinations, compositions, and methods particularly pointed out in the appended claims.

SUMMARY OF THE INVENTION

Disclosed hereafter by way of example is a system and associated methodology that allows application instances to be virtualized and operate in a fault tolerant and load-balanced means across a cluster of servers and yet still have access to a common pool of data. Virtualizing an application across a server cluster allows the system to work seamlessly and transparently regardless of the physical node where it is being hosted. Once virtualized, the application answers and provides its data though a "virtual" endpoint (virtual hostname or internet protocol address that is different than the local host name or internet protocol address). The instantiated virtualized application behaves and functions as if running in a stand-alone mode but is nonetheless one that can be transitioned from node to node in a cluster and continue to seamlessly function.

According to one embodiment of the present invention, a system for server cluster application virtualization includes a plurality of servers configured into a server cluster farm. Each server within the cluster includes, among other things, a local monitor engine, a cluster monitor engine, a host engine, and an application engine. The host engine is moreover operable to form at least one virtual host and associated virtual Internet protocol address. For purposes of the present invention, a virtual host is a logical instance container that operates on top of physical and virtual servers, and accordingly does not include an operating system. A virtual host is not a virtual machine. Each virtual host instantiates and is tied to at least one virtual IP address that can be on any sub-network(s). The system for server cluster application virtualization, also includes at least one instantiation of an application that is configured to operate on top of one of the one or more virtual hosts at each server. Accordingly, upon failover the virtual host migrates to another server along with the application instance(s) and the virtual IP address(es).

According to another embodiment of the present invention, a method is described to virtualize server cluster applications. The method begins by forming at least one virtual host in a server cluster. That virtual host resides on a node within the cluster that includes a node Internet protocol address, a local monitor engine, a cluster monitor engine, a host engine, and an application engine. The process continues by instantiating an application on top of the virtual host wherein the application is associated with a virtual Internet protocol address that is distinct from the node Internet protocol address.

According to another embodiment of the present invention, a computer readable storage medium tangibly embodies a program of instructions that is executed by a server within a server cluster wherein the program of instructions includes a plurality of program codes for server cluster application virtualization. The program of instruction includes program code for managing requests received from other nodes within the server cluster and program code for receiving requests from a user interface. The program of instruction further includes code to establish at each node within the server cluster one or more virtual host wherein each virtual host includes a virtual Internet protocol address. Lastly, the program of instruction further includes code to instantiate an application on top of the one or more virtual hosts.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

Figure 1A:
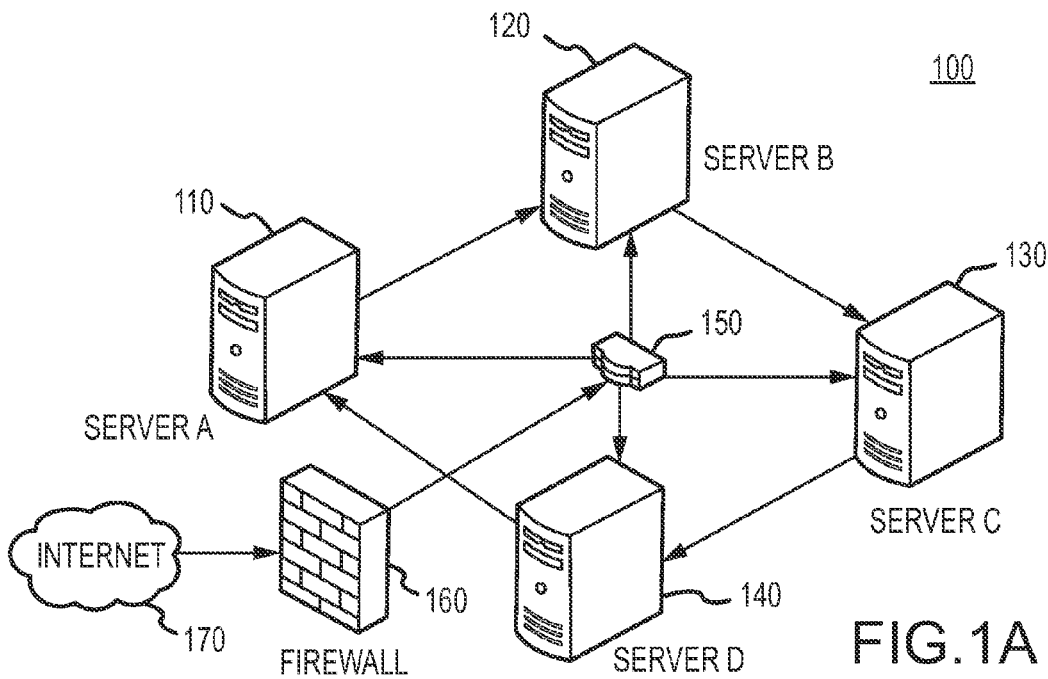
FIG. 1A is a high level block diagram of a server cluster environment as is known in the prior art.
Figure 1B:
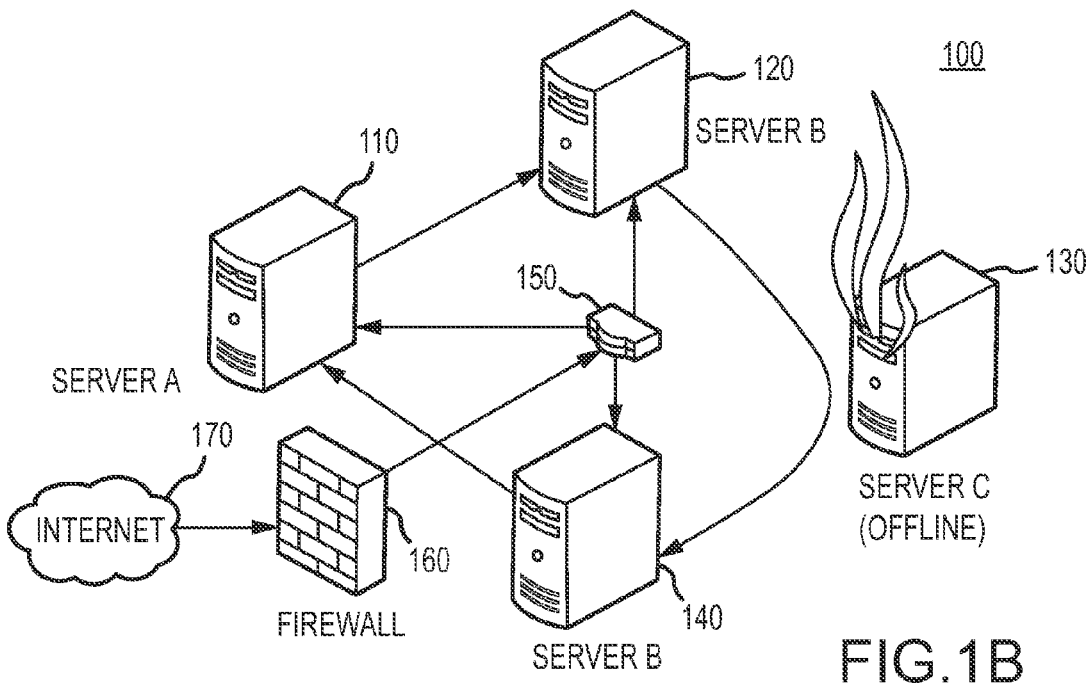
FIG. 1B is a high level block diagram of the server cluster environment of FIG. 1A depicting a server failure and system failover.

A system and associated methodology for server cluster application virtualization is hereafter described by way of example. A computer or server cluster is a set of loosely connected computers that work together. In many respects, a "cluster" can be viewed as a single machine. Normally, and as shown in FIG. 1A, the individual components are connected via a local network in which each computer or node runs its own instance of a file system. These file systems and database engines serve as the building blocks for larger custom applications, however, as previously discussed, each application typically communicates with a single instantiation of the underlying file system. Thus, environments having multiple applications must maintain corresponding multiple instantiations of the file system, or, in alternative, limit each instantiated server to a single application. If the server (system) fails, each application and its corresponding instantiation of the underlying file system must be recreated and, until the recovery is complete, the application and its associated data is unavailable. Similarly, a server that is heavily tasked by a single application can result in performance degradation, both for that application and others that reside on parallel instantiations of the underlying file system. The present invention virtualizes or forms one or more virtual hosts to provide a fault-tolerant and load-balanced platform by which to access a common pool of data across the server cluster. Virtual applications working on top of the virtual host enables the application to work seamlessly and transparently across the system, regardless of where the application is actually (physically) hosted. According to the present invention, once an application is virtualized, it communicates through a virtual endpoint (a virtual host name and virtual internet protocol address) that is different from a local host name or physical internet protocol address. The virtualized application behaves and functions as if it is running in a stand-alone mode on a physical server and yet can be transitioned from one node to another and continue to function.

Embodiments of the present invention are hereafter described in detail with reference to the accompanying Figures. Although the invention has been described and illustrated with a certain degree of particularity, it is understood that the present disclosure has been made only by way of example and that those skilled in the art can resort to numerous changes in the combination and arrangement of parts without departing from the spirit and scope of the invention. The disclosure includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purposes only and not for the purpose of limiting the invention as defined by the appended claims and their equivalents.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment. By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

For the purpose of the present invention, the following terms are defined to add clarity and prevent any confusion or misconception.

Internet Protocol (IP) is the principal communications protocol used for relaying datagrams (also known as network packets) across a network using the set of communications protocols. It is generally the most popular protocol stack for wide area networks and is commonly known as TCP/IP, because of its most important protocols. IP is responsible for routing packets across network boundaries and is the primary protocol in the Internet Layer of the Internet Protocol Suite. For this purpose, IP defines datagram structures that encapsulate the data to be delivered. It also defines addressing methods that are used to label the datagram source and destination.

New Technology File System (NTFS) is the standard and proprietary file system developed by Microsoft for the Windows line of operating systems including for example Windows NT, Windows XP and Windows Server.

Small Computer System Interface (SCSI) is a set of standards for physically connecting and transferring data between computers and peripheral devices. The SCSI standards define commands, protocols, and electrical and optical interfaces. SCSI is most commonly used for hard disks and tape drives, but it can connect a wide range of other devices, including scanners and CD drives, although not all controllers can handle all devices. The SCSI standard defines command sets for specific peripheral device types; the presence of "unknown" as one of these types means that in theory it can be used as an interface to almost any device, but the standard is highly pragmatic and addressed toward commercial requirements Microsoft Cluster Server Software (MSCS) is software designed to allow servers to work together as a computer cluster and to provide failover and increased availability of applications, or parallel calculating power in case of high-performance computing (HPC) clusters (as in supercomputing), that allows servers working together as a computer cluster.

In object-oriented programming, an instance (or instantiation) is an occurrence or a copy of an object, whether currently executing or not. Instances of a class share the same set of attributes, yet will typically differ in what those attributes contain. For example, a class "Employee" would describe the attributes common to all instances of the Employee class. For the purposes of the task being solved, Employee objects may be generally alike, but vary in such attributes as "name" and "salary." The description of the class would itemize such attributes and define the operations or actions relevant for the class, such as "increase salary" or "change telephone number." One could then talk about one instance of the Employee object with name="Jane Doe" and another instance of the Employee object with name="John Doe".

Also, in object-oriented programming, a class is a construct that is used as a blueprint to create instances of itself—referred to as class instances, class objects, instance objects or simply objects. A class defines constituent members which enable these class instances to have state and behavior. Data field members (member variables or instance variables) enable a class object to maintain state. Other kinds of members, especially methods, enable a class object's behavior. Class instances are of the type of the associated class.

One aspect of the present invention includes a framework on which an instantiation of an application resident on a node can be virtualized without depending on the use of existing failover cluster techniques or similar products. According to one embodiment of the present invention, a framework is built on top of a shared cluster file system that provides to every node in the cluster full read and write access to data at all times. Moreover, neither MSCS (or similar products) or SCSI reservations are needed to manage access to the file system. Accordingly, applications can be virtualized and quickly brought online on any nodes in the cluster.

Figure 2:
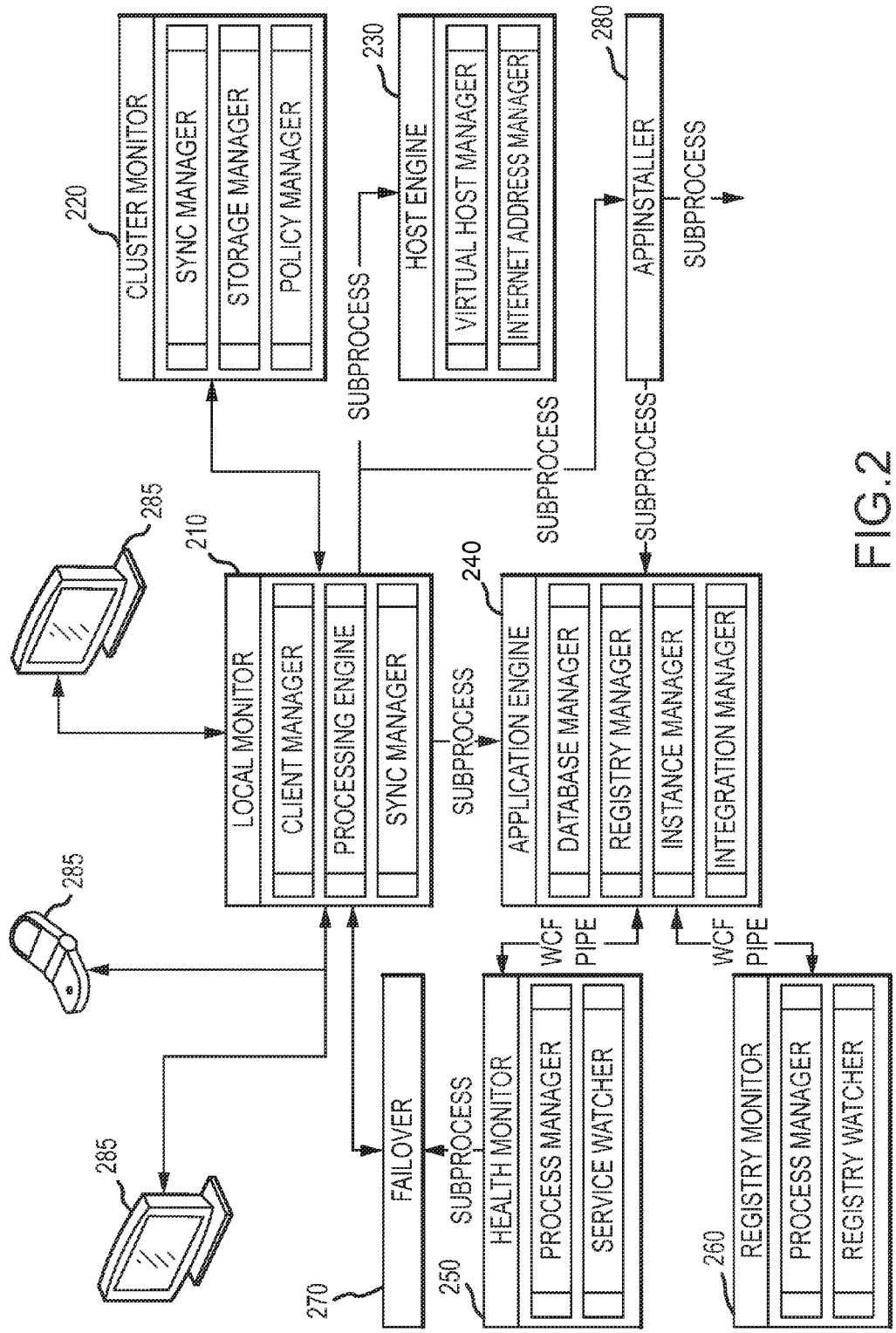
FIG. 2 is a system schematic of a server cluster application virtualization framework according to one embodiment of the present invention.

FIG. 2 is a high-level logical diagram of components resident on each node of the server cluster that, according to one embodiment of the present invention, enables cluster aware application virtualization. According to one embodiment of the present invention, each node in a server cluster includes, among other things, a cluster monitor engine 220, a local monitor engine 210, a host engine 230, and an application engine 240. In other embodiments of the present invention, additional components such as a health monitor 250, the registry monitor 260, and an application installer 280 are included on each node. Each node further includes failover policies 270 and various user interfaces 285 or clients by which a solution illustrator can gain the status of the server cluster and make configuration changes. As shown in FIG. 2, clients 285 communicate with the local monitor engine 210 via a wire protocol used for sending commands, responses, and events.

According to one embodiment of the present invention, the local monitor engine 210 is responsible for receiving and forwarding requests from user interfaces 285 to the host engine 230 and cluster monitor engine 220. The local monitor engine 210 further includes a client manager that handles incoming client requests and passes these requests to the processing engine for maintaining client connections. The processing engine parses and carries out client requests by forwarding the requests to the host engine 230 and/or the cluster monitor engine 220. The local monitor engine 210 also includes a synchronization manager that keeps the state and configuration files synchronized across the entire cluster. Accordingly, when a command is received by the user interface 285 to add or form a virtual host, the synchronization manager relays this information to the cluster monitor engine so that the configuration files on other nodes can be updated.

The cluster monitor engine 220 is a primary means of communication between other nodes in the server cluster. The cluster monitor engine is responsible for receiving and forwarding requests from other cluster monitors to the local monitor engine at each node. The cluster monitor engine is also responsible for initiating and managing failover and failover policies when a node joins or leaves the server cluster. In one embodiment of the present invention, the cluster monitor engine accomplishes this task by writing a system service daemon. In addition, the cluster monitoring engine is asked to coordinate all the actions between all available nodes in the cluster using the cluster coordinator. The cluster monitor engine also includes a synchronization manager that keeps the state and configuration of files synchronized across the cluster and works along with the synchronization manager of the local monitor engine 210. The storage manager interfaces with the cluster shared file system and maintains a cluster membership list so that each node maintains an up-to-date list of files throughout the server cluster. Lastly, the cluster monitor engine 220 includes a policy manager that carries out failover and fail back policies.

Each node of the server cluster further includes a host engine 230 that is responsible for establishing and maintaining virtual hosts and virtual Internet protocol addresses. Recall that a virtual host is a logical instance container that operates on top of physical and virtual servers. Each virtual host instantiates and is tied to at least one virtual IP address that can be on any sub-network(s). Invoked by the local monitor engine 210, the host engine 230 handles specific requests to create virtual hosts and exits when finished. The host engine 230 accordingly includes a virtual host manager that maintains and manages a virtual host list as well as an Internet address manager that manages virtual Internet protocol address subscriptions.

The local monitor engine 210 is further in communication with an application engine 240. The application engine 240 is responsible for establishing and managing an application such as SQL server (or other virtualized application). Like the host engine 230, the application engine 240 is invoked by the local monitor engine 210 in response to requests. Once an application is instantiated, the application engine 240 exits. As shown in FIG. 2, the application engine includes a database manager that maintains and manages database files for each instance. A registry manager further maintains and manages the registry values for each virtualized instance, and an instance manager that manages and maintains instance configurations is stored on each disk. Lastly, an integration manager handles instance registration with the registry and health monitor engines.

In another embodiment of the present invention, each node of the server cluster further includes a health monitor 250 and a registry monitor 260. The health monitor is responsible for monitoring the health of each instantiation of an application and signaling a failover or failback event. The health monitor runs as a system service daemon and listens on a particular communication protocol for remote procedure requests. The health monitor engine 250 includes a process manager that handles incoming requests from the local monitor engine 210 and maintains a registration list of such requests. It also includes a service watcher that monitors service health and other events based on a registration policy. When required, the health monitor engine 250 invokes a failover tool 270 when cluster reconfiguration is required. The failover tool and policies reside in a failover repository 270 that is in communication with the local monitor engine 210 and accordingly, the cluster monitor engine 220.

The registry monitor 260 which, in communication with the application engine 240, monitors registry changes and maintains these changes to nonvolatile storage. The registry monitor also runs as a system service daemon for additional remote procedure requests. The duties of the registry monitor include handling incoming requests and maintaining a registration list, as well as carrying out registry registration requests and events based on established registration policies.

Client applications issue administrative commands to backend components by connecting to the monitor engine and specifically the monitor daemon and send specifically formatted commands to other components of each node and other nodes within the server cluster. Such client applications can also receive command replies and asynchronous status messages through the same connection commands are transmitted, typically, as binary data streams similar to the XDR format described in Internet RFC 1832. Another feature of the present invention is the ability to send and receive state-ful alerts of the cluster environment. State-ful alerts represent an ongoing condition somewhere in the cluster, for example, and accessible or non-operative nodes. Alerts can be raised, modified, or lowered, by sending a single status message to the cluster. Because components (node) can connect and disconnect, it is possible for several alerts to be outstanding as a new node connects to the cluster. For example, if a node crashes, an inaccessible node alert is raised. If a new node connects a few seconds later, it will not receive a status message from the inaccessible node alert, and will be unable to display the message on the screen or to convey that message to user. To resolve this issue, each component in the status relay network must retain the most recent state-ful raised alerts in the form of a small, in memory, alert database. When a new computer connects to the status relay network, the complete alert database is relayed to the new peer, as if the alerts were just generated. One function of the health monitor is to receive and analyze alerts. Based on the alerts received, the health monitor can be configured to carry out specific actions. These actions are configured through policies, and policies are generally specific to each type of alert. Generally, specific details include a set of predetermined actions that are established to take place when an alert is raised.

The present invention (referring generally to FIG. 2) establishes a system for application virtualization. On each node of a server cluster a local monitor engine communicates with, among other things, a cluster monitor engine and a host engine to form one or more environments on which a virtual version of an application can be formed. Each virtual application resides on a virtual host that possesses a unique host name and IP address. Upon the occurrence of a failover or failback condition, the virtual host and its associated virtual application is relocated to a new node based on the established failover policies. Once relocated, the new instantiation of the virtual host possesses the same name and IP address as the prior version, thus, from the Application's perspective, access to the system is seamless.

The present invention utilizes a cluster shared file system where every server in the cluster can read/write to the same blocks of disk. Without the constraint imposed by SCSI reservation, a virtualized application can quickly, easily and efficiently be brought online on any server in the cluster. Moreover, for any applications that support a "Shared Everything" architecture, the invention can be extended to provide a cheaper and more efficient load-balanced platform for the applications.

To better understand the intricacies of the present invention, consider the following example. In one example (referring generally to FIG. 2), the Local Monitor Engine 210 communicates with the Host Engine 230 to establish and bind a virtual host and virtual IP address to the local server. The Local Monitor Engine 230 then communicates with the Application Engine 240 to process and transform an instance of an application of choice (in this example) into a cluster application that binds to the virtual host. In the context of the present invention, a cluster application is one that is cluster aware as opposed to an application that is solely aware of its underlying host. Returning to the example, the Local Monitor Engine 210 also communicates with the Cluster Monitor Engine 220 to ensure all servers in the cluster are aware of the new cluster application so that they can correctly participate in the cluster quorum. Similarly, the Cluster Monitor 220 monitors other applications instantiated at other nodes within the cluster. To provide high availability for the application, the Application Engine 240 registers the application with the Registry Monitor 260 and the Health Monitor 250.

When there is a change in the local registry key of the application, the Registry Monitor 260 persists the change to a shared disk. This ensures the cluster as a whole will always have the latest image of the registry hive. If an application service fails or goes offline on one of the active servers in the cluster (ie. the node fails), the Health Monitor 250 will signal a failover with the Local Monitor Engine 210 in conjunction with the failover policy repository 270. According to one embodiment of the present invention, the failover polices designate where a particular instantiation of an application will reside in the event of a node failure. Once the target node is identified, a request is initiated.

The Local Monitor Engine 210 communicates with the Cluster Monitor Engine 220 to forward the request to other remote Cluster Monitor Engines. Each remote Cluster Monitor Engine, in turn, forward the request to their respective Local Monitor Engines. The remote Local Monitor Engines then pass the request down to the Host Engine and Application Engine. If the remote server is the next available server (as designated by the failover policy) of the virtual host, the remote Host Engine starts binding the prior virtual host and virtual IP to its new network interface, and the remote Application Engine starts processing the application and registering it with the remote Registry and Health Monitor.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

Virtualizing an application according to one or more embodiments of the present invention allows an application to work seamlessly and transparently, regardless of where or on what system the application is actually hosted (i.e. on physical or virtual server). A virtualized application such as SQL Server behaves and functions as if it is running in a stand-alone mode. With a proper failover engine built on cluster shared file system, a virtualized application can, according to the present invention, be transitioned from node to node in a cluster/cloud infrastructure seamlessly and continue to function. In addition, multiple applications share a single pool of storage, eliminating the need to pre-allocate individual storage quorums for each clustered application. The present invention provides for an application consolidation platform in which multiple instances of an application can be stacked on a single server.

Included in the description are flowcharts depicting examples of the methodology which may be used to form a server cluster application virtualization. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

Figure 3:
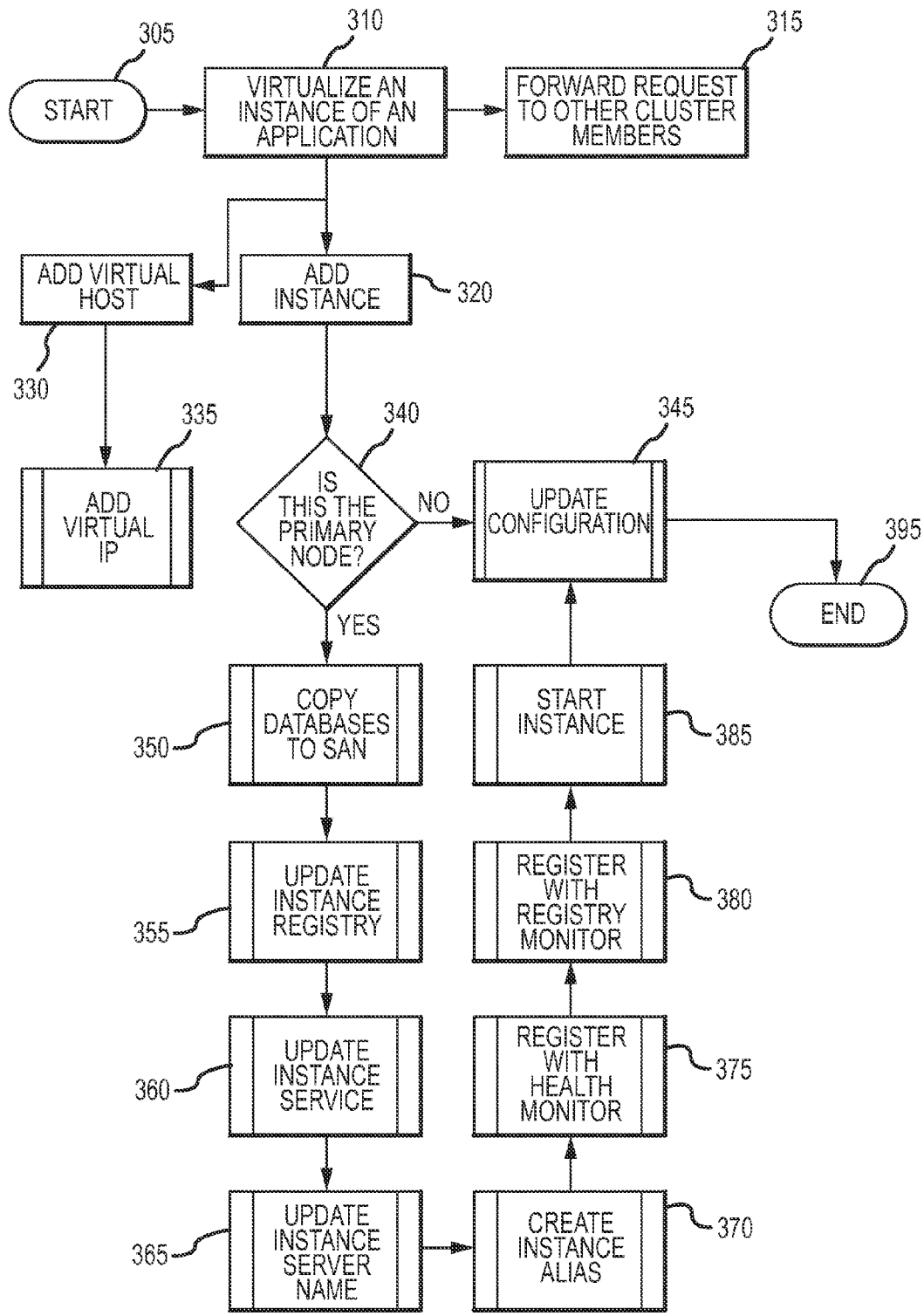
FIG. 3 is a flowchart of one method embodiment for virtualizing server cluster applications according to the present invention.

Turning attention now in addition to FIG. 3, a flowchart for application virtualization in a server cluster according to one embodiment of the present invention can be seen. The process begins 305 with a request for the virtualization of an instance of an application 310. This request is conveyed not only amongst the components of the receiving node but forwarded 315 to each other cluster monitor/node within the server cluster. The request to virtualize instantiation of an application is sent to both the application engine and the host engine. Upon arrival at the host engine, the request results in the addition of the virtual host 330 and the addition of a virtual Internet protocol address 335. Correspondingly, the application engine adds an instance of the application 320 and issues a query 340 whether or not this node is the primary node of application instantiation.

If the node receiving the request is a primary node 340, databases associated with the application are copied to the storage area network 350. Thereafter, the registry of instantiation is updated 355 and the instant service is updated throughout the cluster environment 360. The instance server name is updated 365 to align with the name of the virtual host as is the Internet protocol address associated with the instantiation. An alias for the instantiation is created 370 and that alias is registered with the Health Monitor 375. The registration is also registered with the Registry Monitor 380 and the application instantiation is initiated 385 and, with the instantiation complete, the application configuration is updated 345 and the existence of a new application is communicated to the rest server cluster, ending 395 the process.

One skilled in the relevant art will recognize that some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" or "process" is a self-consistent sequence of operations or similar processing leading to a desired result. In this context, algorithms and operations involve the manipulation of information elements. Typically, but not necessarily, such elements may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," "words," or the like. These specific words, however, are merely convenient labels and are to be associated with appropriate information elements.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Likewise, the particular naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Figure 4A:
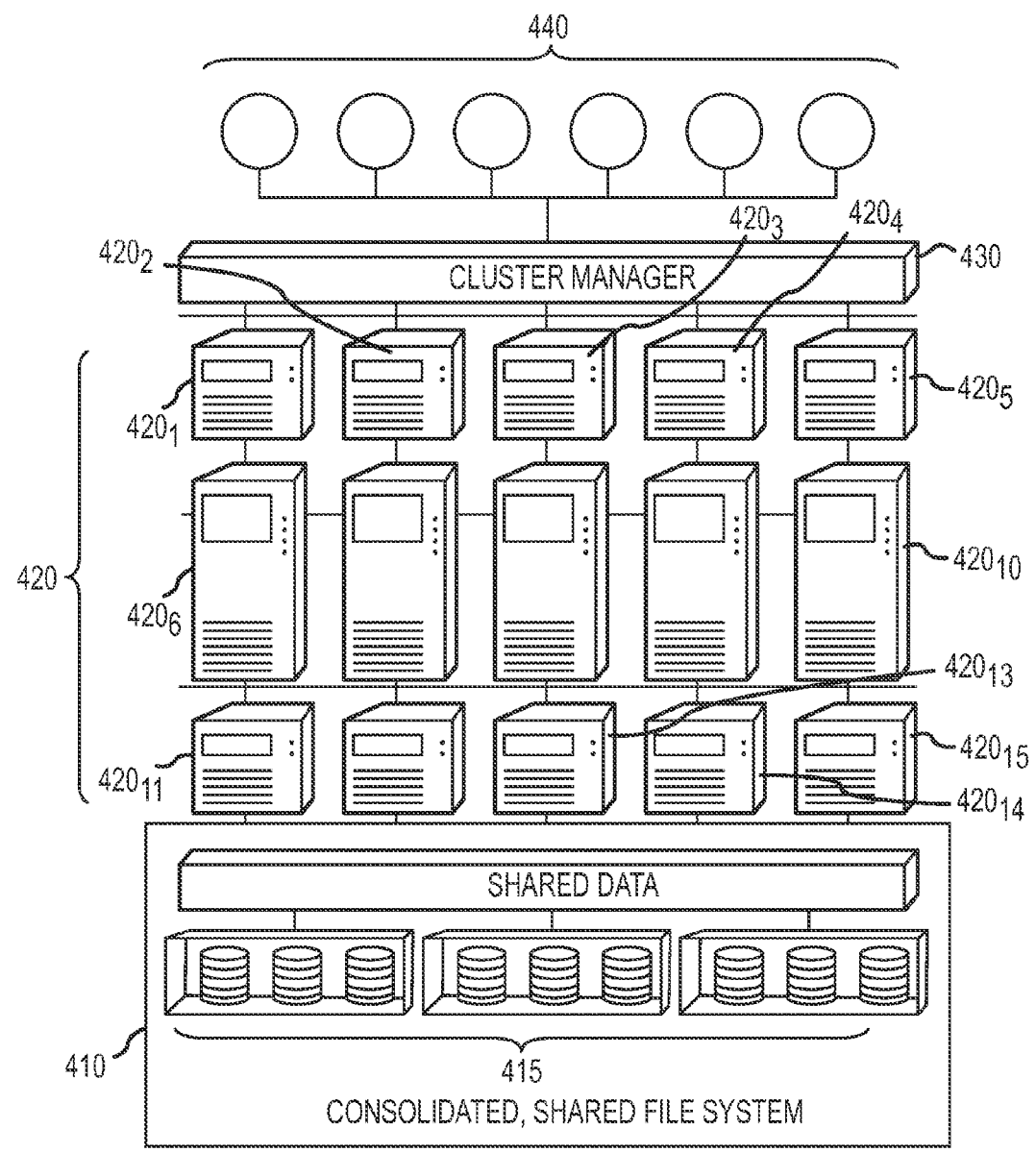
FIGS. 4A-D show a progressive application of server cluster application virtualization according to one embodiment of the present invention.

To better understand the concepts presented in the present disclosure and to appreciate the applications of the present invention in a server cluster, consider the following example. FIG. 4A through FIG. 4D presents a series of the depictions of a server cluster environment in which virtualized applications reside on one or more servers in accordance with embodiments of the present invention. Turning attention now to FIG. 4A, a cluster server environment is presented that comprises a plurality of servers 420 that are communicatively coupled together and in further communication with a consolidated shared file system 410. The server cluster 420 is managed by a cluster manager 430 and is in turn in communication with a plurality of clients or user interfaces 440. In the present depiction, the shared data or consolidated shared file system 410 is comprised of a series of storage media 415 such as a storage area network or similar system. Indeed, the storage pool can be a single storage array or made up of a combination of storage area network arrays from various third-party vendors. Each server with ending server cluster 420 can be either a virtualized server or physical server. In the present depiction 15 servers are depicted, $420_1$-$420_{15}$. Note that the present invention is equally applicable to a variety of different server sizes and types in that a heterogeneous server cluster is supported by the present invention.

Figure 4B:
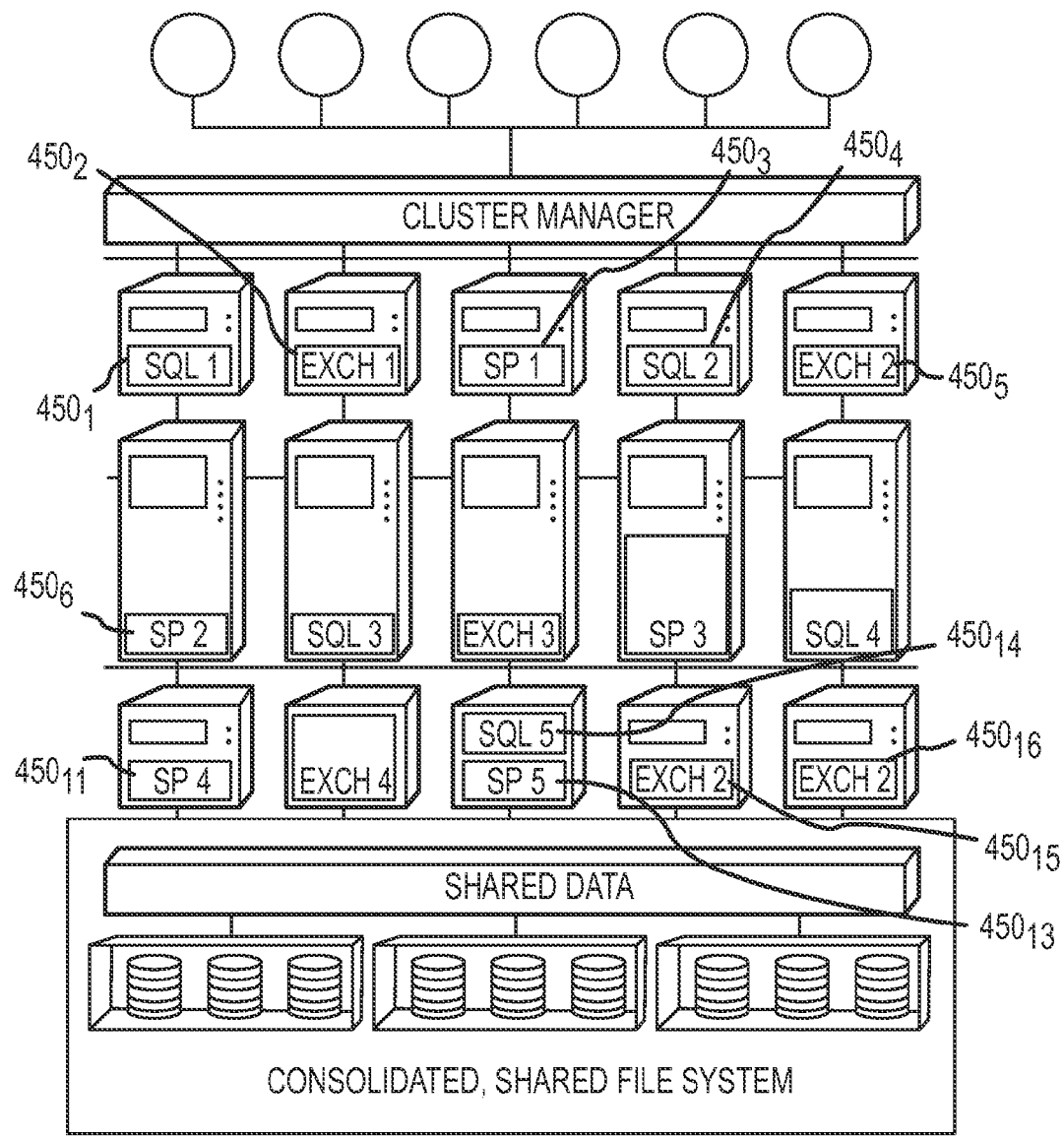

FIG. 4B shows the same server cluster environment in which at least one application is associated with each server within the server cluster. For example server $420_1$ is associated with a SQL 1 application $450_1$. Similarly, server $420_5$ is associated with an exchange application $450_5$. Similar correspondence of application servers throughout the server cluster can be seen. FIG. 4B represents a typical server cluster environment in which each application resides on a single instance of an application per server.

In accordance with the present invention, each node within the server cluster includes various components, including a cluster monitor engine, a local monitor engine, and a host engine. These components work with additional components such as the Health Monitor and Registry Monitor to assess the overall health of, not only that particular node, but other nodes within the cluster environment. By establishing a virtual host, as well as a virtual Internet address for that host, multiple application instances can be placed on a single physical server rather than the typical situation in which a single instance must reside on a single server. The ability of the virtual host to possess its own Internet protocol address and to be server cluster aware so as to freely access data from the consolidated shared file system enables a virtual host to be relocated from one physical node to another should the health of that particular node be in question.

Figure 4C:
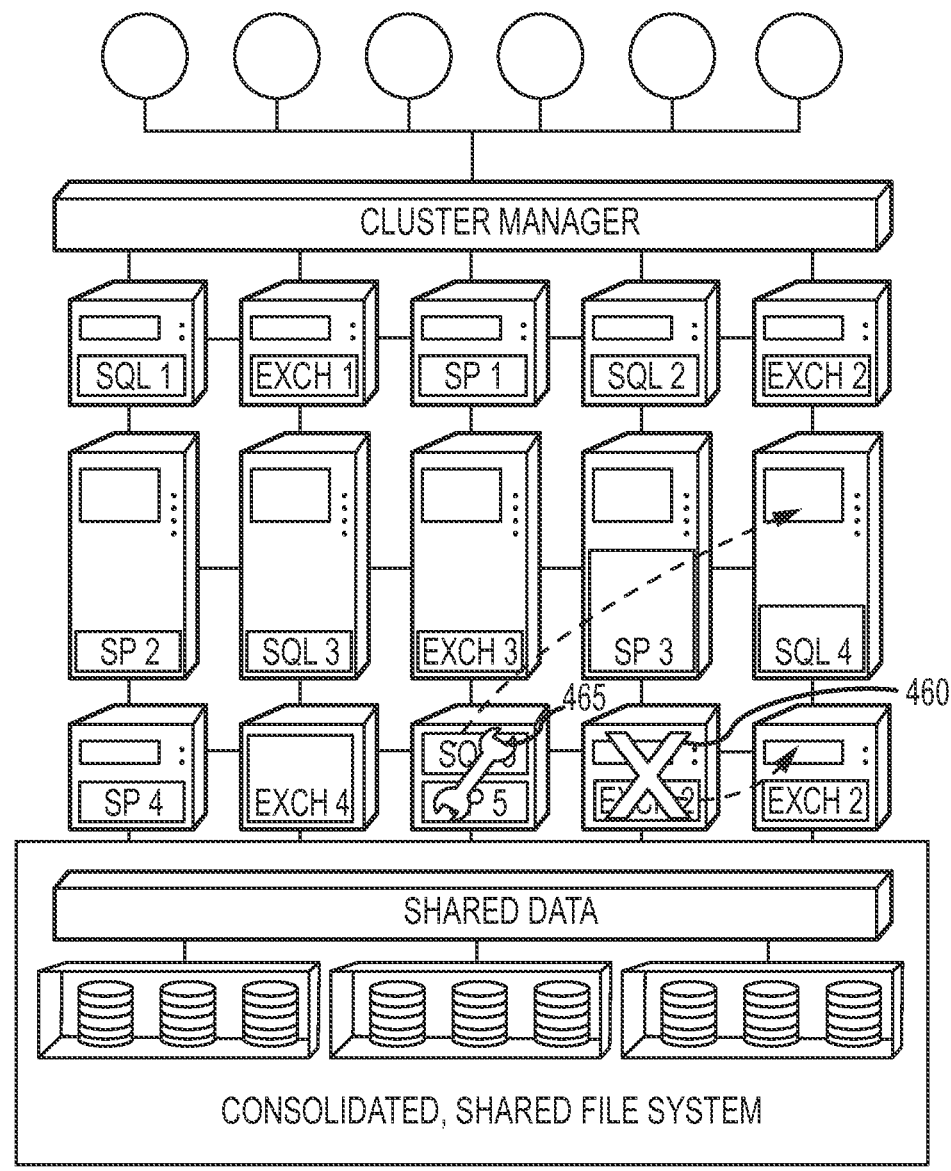

FIG. 4C is an example of the failure of one or more nodes in a server cluster environment. In this particular example, two servers have been identified as failing. The first server $420_{13}$ has been deliberately taken down for maintenance, as is illustrated by the wrench 465 overlaying the image of the server. Similarly, the second server, server $420_{14}$ has been identified by the Health Monitor as failing 460. In both situations, the instantiation of the applications on each server can no longer function. According to one embodiment of the present invention, failover policies exist in which in the event of a server failure, the instantiation of a particular application is designated to be relocated to another node. Consider for the present example that the SQL 5 application and the SP 5 application resident on the first server $420_{13}$ possesses a failover policy relocation to server $420_{10}$. Similarly, the application EXCH 2 that is instantiated on the failed server $420_{14}$ possesses a failover policy relocation to server $420_{15}$.

Figure 4D:
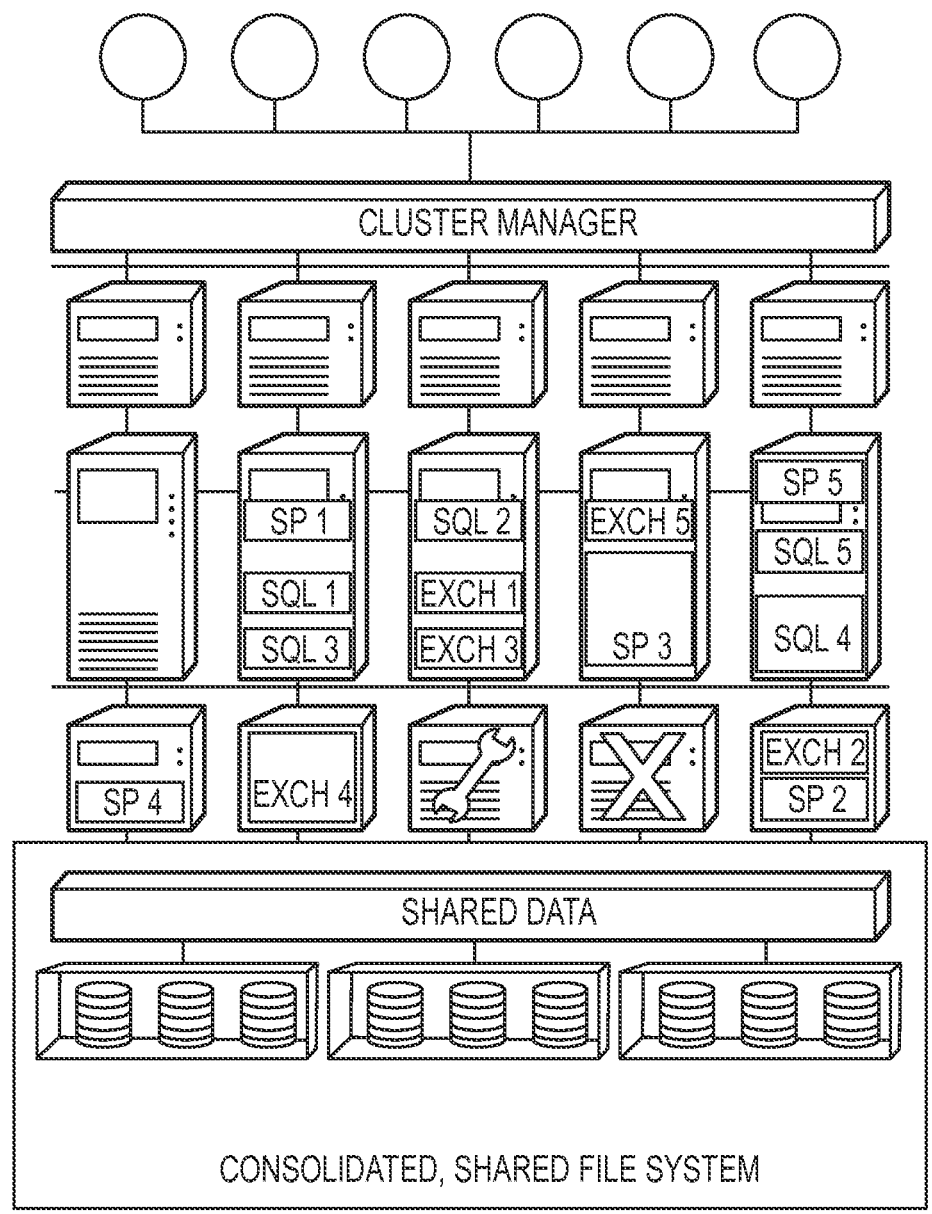

FIG. 4D illustrates that the application instantiations located on the server that was undergoing maintenance, and on the server that was failing, has been relocated according to predetermined failover policies. In a similar manner, an IT professional can designate certain servers with and the server cluster as being idle or as being artificially failed resulting in the application, which may be instantiated on that server to follow its predetermined failover policy. By doing so, the application instantiations can be relocated to other servers to more efficiently utilize the server capability. This is accomplished, according to one embodiment of the present invention, by instantiating the application on top of a virtual host and, with its own unique virtual Internet protocol address. By doing so, the instantiation of the application maintains a seamless conductivity to the consolidated shared file system, regardless of which physical server to which it may reside. Thus, FIG. 4D illustrates that the application instantiations associated with many of the physical servers have been relocated so as to stack multiple applications on one or more servers. By doing so, and as by seen in FIG. 4D, the server cluster that originally comprised 15, physical servers, each within a single in potentiation of an application, can be consolidated into seven physical servers in which multiple instantiations of applications are stacked on one or more servers. Thus, this server cluster application virtualization provides the IT professional the ability to more efficiently and cost-effectively manage a server cluster and to prevent or minimize costly downtime of the re-instantiation of applications as a move from one server to another due to either maintenance or computer failure.

While there have been described above the principles of the present invention in conjunction with a system and associated methodology for server cluster application virtualization, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

I claim:

1. A system for server cluster application containerization, comprising:
    a plurality of computing devices communicatively connected via a network wherein at least one of the computing devices includes instructions stored on a storage medium and a processor to execute the instructions to form a virtual computing device and wherein the plurality of computing devices and the virtual computing device are servers configured into a server cluster wherein each server within the server cluster includes an internet protocol address, a local monitor engine, a cluster monitor engine, a host engine, and an application engine;
    one or more virtual hosts, formed by the host engine, operating on top of each server within the server cluster wherein each of the one or more virtual hosts is a logical instance container free of an operating system, and wherein each virtual host instantiates and is tied to at least one virtual internet protocol address distinct from the internet protocol address of the server on which it operates; and
    at least one instantiation of an application operating on top of the one or more virtual hosts wherein the host engine is operable to transfer the one or more virtual host, its virtual internet protocol address and the instantiation of the application from one server of the server cluster to another server in the server cluster.

2. The system for server cluster application containerization of claim 1, wherein the local monitor engine is operable to manage incoming requests from a user interface and/or from the cluster monitor engine.

3. The system for server cluster application containerization of claim 2, wherein the local monitor engine synchronizes requests from the user interface with the cluster monitor engine.

4. The system for server cluster application containerization of claim 1, wherein the cluster monitor engine is communicatively coupled to each server within the server cluster and is operable to manage requests received from other servers in the server cluster.

5. The system for server cluster application containerization of claim 1, wherein the cluster monitor engine maintains and carries out fail over policies.

6. The system for server cluster application containerization of claim 1, wherein the host engine is operable to establish the at least one virtual internet protocol address for each virtual host.

7. The system for server cluster application containerization of claim 1, wherein the application engine is operable to establish and maintain the at least one instantiation of the application on the virtual host.

8. The system for server cluster application containerization of claim 1, wherein the application engine transforms the at least one instantiation of the application on a physical server into a cluster application bound to a virtual host.

9. The system for server cluster application containerization of claim 1, wherein each server within the server cluster further comprises a health monitor.

10. The system for server cluster application containerization of claim 9, wherein the health monitor is operable to monitor a predetermined set of application performance and system requirements.

11. The system for server cluster application containerization of claim 1, wherein each server within the server cluster further comprises a registry monitor.

12. The system for server cluster application containerization of claim 1, wherein each server within the server cluster can be associated with a plurality of virtual hosts.

13. A method for server cluster application containerization, comprising:
    forming at least one virtual host on each server in a server cluster, wherein the at least one virtual host is a logical instance container free of an operating system having at least one virtual internet protocol address, the server cluster includes physical and virtual machines, and each server in the sever cluster includes a server internet protocol address, a local monitor engine, a cluster monitor engine, a host engine, and an application engine;
    instantiating an application on top of the virtual host wherein the application and virtual host are tied to the at least one virtual internet protocol address distinct from the server internet protocol address; and
    transferring the virtual host, its virtual internet protocol address and the application from one server of the server cluster to another server in the server cluster.

14. The method for server cluster application containerization according to claim 13, wherein the local monitor engine manages incoming requests from a user interface and/or requests from the cluster monitor engine.

15. The method for server cluster application containerization according to claim 13, wherein the cluster monitor engine manages requests received from other servers in the server cluster.

16. The method for server cluster application containerization according to claim 13, wherein the host engine establishes one or more virtual hosts and one or more virtual internet protocol addresses.

17. A non-transitory computer-readable storage medium tangibly embodying a program of instructions executable by a server within a server cluster comprised of physical and virtual machines wherein each server within the server cluster includes a server internet protocol address and wherein said program of instruction comprises a plurality of program codes for server cluster application containerization, said program of instructions comprising:
    program code for managing requests received from other servers within the server cluster;
    program code for receiving requests from a user interface;
    program code establishing at each server of the server cluster one or more virtual hosts wherein the one or more virtual hosts are each instance containers free of an operating system;
    program code for instantiating an application on the one or more virtual hosts wherein the one or more virtual hosts each instantiates and is tied to at least one virtual internet protocol address distinct from the internet protocol address associated with the server on which it operates; and
    program code for transferring the virtual host, its virtual internet protocol address and the application from one server of the server cluster to another server in the server cluster.

18. The computer-readable storage medium embodying a program of instructions of claim 17 wherein the program of instructions further comprising program code for maintaining and carrying out failover polices using one or more virtual hosts.

19. The computer-readable storage medium embodying a program of instructions of claim 17 wherein the program of instructions further comprising program code for establishing virtual Internet Protocol addresses associated with each of the one or more virtual hosts.

20. The computer-readable storage medium embodying a program of instructions of claim 17 wherein the program of instructions, further comprising program code for coupling the instantiation of the application to the virtual host.

\* \* \* \* \*